(12) United States Patent
Bhiday et al.

(10) Patent No.: US 11,742,951 B1
(45) Date of Patent: Aug. 29, 2023

(54) TRANSCEIVER CONFIGURATION

(71) Applicant: Arista Networks, Inc., Santa Clara, CA (US)

(72) Inventors: Aditya Bhiday, Sunnyvale, CA (US); Radu Handolescu, San Jose, CA (US); Alex Volinsky, Campbell, CA (US); Hacene Chaouch, Tucson, AZ (US); Robert Spark, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/742,298

(22) Filed: May 11, 2022

(51) Int. Cl.
*H04B 10/40* (2013.01)
*H04B 1/59* (2006.01)
*H04B 1/40* (2015.01)
*H04B 1/16* (2006.01)

(52) U.S. Cl.
CPC .......... *H04B 10/40* (2013.01); *H04B 1/1615* (2013.01); *H04B 1/40* (2013.01); *H04B 1/59* (2013.01)

(58) Field of Classification Search
USPC ....................................................... 398/135
See application file for complete search history.

(56) References Cited

U.S. PATENT DOCUMENTS

| | | | | |
|---|---|---|---|---|
| 8,582,978 B2* | 11/2013 | Ekkizogloy | ............ | H04B 10/40 398/136 |
| 11,099,339 B1* | 8/2021 | Wingrove | .............. | H04B 10/40 |
| 11,539,439 B2* | 12/2022 | Tanaka | .................. | H04J 3/0685 |
| 2004/0202476 A1* | 10/2004 | Woolf | ................... | H04B 10/40 398/128 |
| 2007/0065151 A1* | 3/2007 | Dybsetter | .............. | H04B 10/40 398/135 |
| 2012/0251124 A1* | 10/2012 | Lewis | ................... | H04B 10/40 398/135 |

* cited by examiner

*Primary Examiner* — Dalzid E Singh
(74) *Attorney, Agent, or Firm* — Fountainhead Law Group P.C.

(57) ABSTRACT

Certain network switch device can use pluggable transceivers to send and receive data. Transceiver may be capable of operating in multiple different operating modes defined by parameters such as speed. Application data indicating one or more operational modes supported by the transceiver may be read from a memory of a transceiver. An interface may be provided by a network switch device that indicates the one or more operational modes and identifiers of the one or more operational modes. The transceiver may be configured by the network switch device to operate in a selected operational mode based on a selection of an identifier corresponding to the selected operational modes. The selected operational mode, which may require multiple parameters to be configured on the transceiver, may be set using a single command based on the identifier.

20 Claims, 4 Drawing Sheets

TRANSCEIVER CONFIGURATION

BACKGROUND

The present disclosure pertains to computer networks, and in particular to configuration of transceivers.

A network switch device is a computer networking hardware that connects computer devices over a computer network and has network traffic switching or routing, or generally, forwarding capabilities. Certain switches can use pluggable transceivers (e.g., QSFP or OSFP transceivers) to send and receive data. A particular transceiver may be capable of operating in multiple different operating modes, where the operating mode is defined by parameters such as speed. There is a need for improved efficiency and customization in configuring transceivers.

The present disclosure addresses these issues and others, as further described below.

SUMMARY

Some embodiments provide a computer-implemented method. The method includes reading, by a computer device, application data from a memory of a transceiver, the application data indicating one or more operational modes supported by the transceiver. The method further includes providing, by the computer device, an interface indicating the one or more operational modes and identifiers of the one or more operational modes. The method further includes configuring, by the computer device, the transceiver to operate in a selected operational mode based on a selection of an identifier corresponding to the selected operational modes.

Some embodiments provide a computer system. The computer system comprises one or more processors and one or more machine-readable medium coupled to the one or more processors. The one or more machine-readable medium store computer program code comprising sets of instructions executable by the one or more processors. The sets of instructions are executable to read application data from a memory of a transceiver, the application data indicating one or more operational modes supported by the transceiver. The instructions are further executable to provide an interface indicating the one or more operational modes and identifiers of the one or more operational modes. The instructions are further executable to configure the transceiver to operate in a selected operational mode based on a selection of an identifier corresponding to the selected operational modes.

Some embodiments provide one or more non-transitory computer-readable medium storing computer program code comprising sets of instructions. The computer program code includes sets of instructions to read application data from a memory of a transceiver, the application data indicating one or more operational modes supported by the transceiver. The computer program code further includes instructions to provide an interface indicating the one or more operational modes and identifiers of the one or more operational modes. The computer program code further includes instructions to configure the transceiver to operate in a selected operational mode based on a selection of an identifier corresponding to the selected operational modes.

DETAILED DESCRIPTION

Optical transceivers and other transceivers (e.g., pluggable transceivers) may have different modes of operation. The different modes of operation may be based on various parameters such as operating speed (e.g., 100G, 200G, 400G, etc.), forward error correction (FEC) (e.g., concatenated FEC, open FEC, etc.), modulation (e.g., 8QAM, 16QAM, QPSK, etc.), line-rate (e.g., 200G, 300G, 400G, etc.), and optical reach (80 km, 120 km, 450 km, 600 km, 1000 km, etc.). Certain transceivers may advertise (e.g., as readable data) different "applications" (operating modes), each application having a particular set of parameters. For instance, the Common Management Interface Specification (CMIS) specifies that a transceiver may advertise up to 15 different applications. Such transceivers may be plugged into a network switch device and then configured for operation.

Certain transceivers may only have one dimension of configuration, such as operating speed (e.g., 100G, 200G, 400G, etc.). The operating speed may be selected via a network switch device using a "speed" command, for example. As such, the operating mode for such transceivers may be changed using a single command. The command may be input by a user, for example.

Other transceivers may be configurable using more parameters. For example, certain transceivers may permit having their operating speed set and their FEC type set (e.g., C-FEC or O-FEC). For such transceivers, a network switch device user may set the operating mode using two commands, the "speed" command and a "FEC" command.

However, new transceivers are being produced and developed that have operating mode configurations requiring more than two parameters to be set. For instance, OpenZR+ is a multi-source agreement (MSA) that adds modulation, line-rate, and optical reach as parameters that may need to be set in order to uniquely identify a particular operating mode from among the various operating modes that an OpenZR+ transceiver is capable of. With network switch devices that use separate commands to set each parameter, the user may need to input, for example, at least five commands to set five operating parameters to set the transceiver in a particular operating mode ("application").

The following table (1) shows an example of various applications that a particular transceiver may be capable of and the parameters corresponding to that particular application. Such information may be referred to as "application data" herein. In this table, each row corresponds to a particular application.

TABLE 1

| Application | Mode | Link mode | FEC | Line rate speed | Dual Polarization Modulation format | Optical reach |
|---|---|---|---|---|---|---|
| 1 × 400 G C-FEC | ZR | 400g-8 | C-FEC | 400 G | 16 QAM | 80 km |

TABLE 1-continued

| Application | Mode | Link mode | FEC | Line rate speed | Dual Polarization Modulation format | Optical reach |
|---|---|---|---|---|---|---|
| 1 × 400 G O-FEC | ZR+ | 400g-8 | O-FEC | 400 G | 16 QAM | 120 km |
| 1 × 400 G O-FEC | ZR+ | 400g-8 | O-FEC | 400 G | 16 QAM | 450 km |
| 2 × 200 G | ZR+ | 200g-4 | O-FEC | 400 G | 16 QAM | 450 km |
| 4 × 100 G C-FEC | ZR | 100g-2 | C-FEC | 400 G | 16 QAM | 80 km |
| 4 × 100 G O-FEC | ZR+ | 100g-2 | O-FEC | 400 G | 16 QAM | 450 km |
| 3 × 100 G | ZR+ | 100g-2 | O-FEC | 300 G | 8 QAM | 600 km |
| 2 × 100 G | ZR+ | 100g-2 | O-FEC | 200 G | QPSK | 1000 km |
| 2 × 100 G no host FEC | ZR+ | CAUI-4 no FEC | O-FEC | 200 G | QPSK | 1000 km |
| 1 × 100 G | ZR+ | 100g-2 | O-FEC | 100 G | QPSK | 2000 km |
| 1 × 100 G no host FEC | ZR+ | CAUI-4 no FEC | O-FEC | 100 G | QPSK | 2000 km |

Requiring a user to input a different command to set each parameter, as in prior network switch software for configuration of transceivers, is inefficient and error prone. Furthermore, it may be difficult for a user to recognize which applications are available for the transceiver and which parameter combinations are a valid operating mode.

The present disclosure improves upon prior techniques for configuring transceivers by providing a single command that can be used to configure a transceiver for a particular operating mode. The command receives an application number as input and the transceiver is configured according to the operating parameters corresponding to that application number.

The improved configuration interface can display the available applications that one or more transceivers can accept. The configuration interface can determine the available applications based on industry-standard codes (e.g., from SFF-8024, OpenZR+, etc.) as well as vendor/manufacturer specific codes (e.g., from transceiver datasheets). The configuration interface can display the available applications and application numbers for a transceiver and enable a user to directly pick a particular operating mode for the transceiver using an application number. A single command may be used to set the operating mode of the transceiver based on the application number, instead of setting each parameter of the operating mode individually as in prior techniques. Certain transceivers include a media interface including a plurality of lanes (e.g., channels). The improved configuration interface may also enable the user to set which lanes of the transceiver the application is applied to (e.g., lanes 1-4 or lanes 5-8). To facilitate debugging, the improved configuration interface can also display the operational status and any configuration error codes to indicate to the user whether the configured applications were accepted by the transceiver or not, and the respective error codes, if applicable. The improved configuration interface is further described below.

Figure 1:
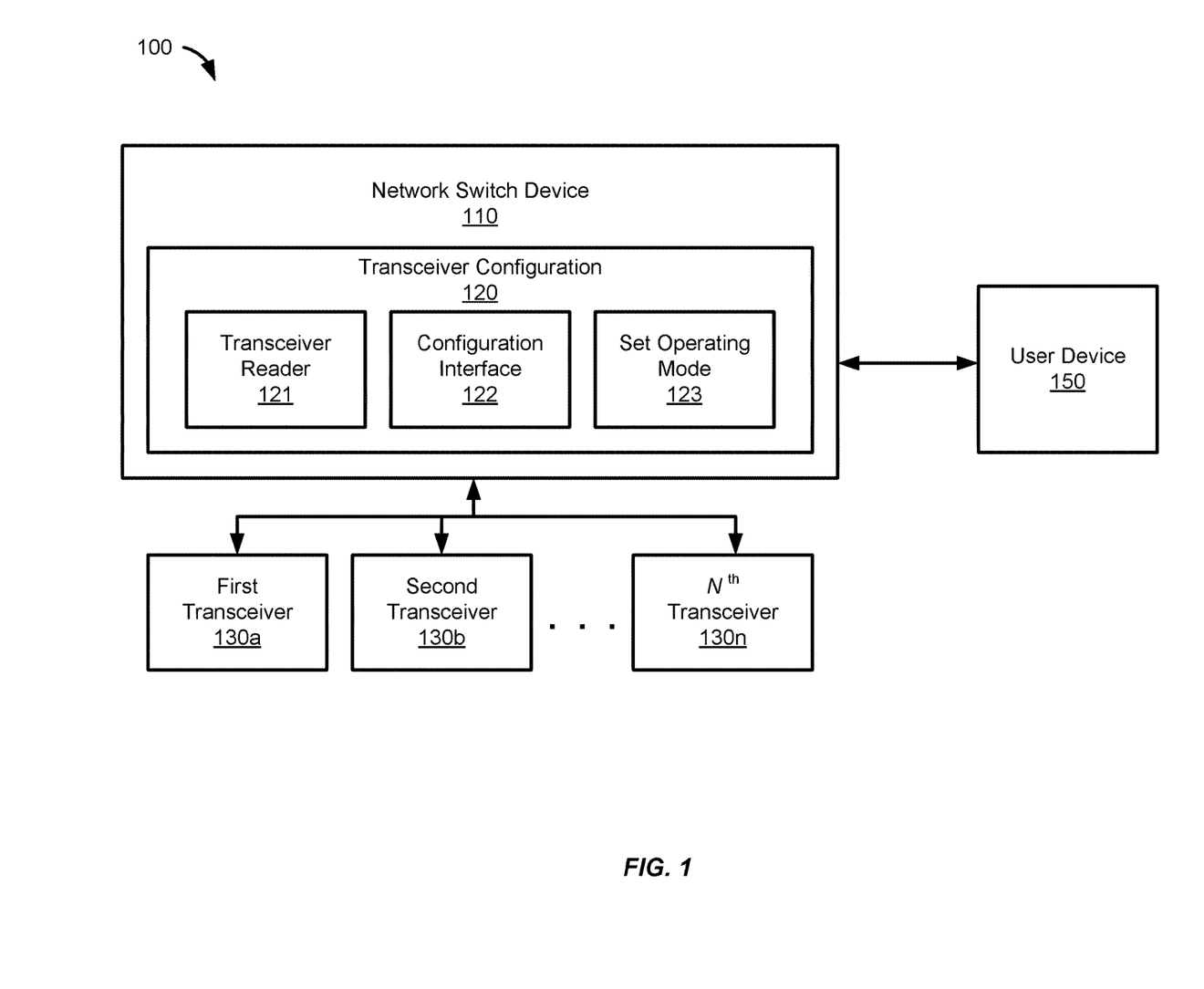
FIG. 1 shows a diagram of a user device and a network switch device for configuring one or more transceivers, according to an embodiment.

FIG. 1 shows a diagram 100 of a user device 150 and a network switch device 110 for configuring one or more transceivers 130, according to an embodiment. In FIG. 1, the transceivers 130 include a first transceiver 130a, a second transceiver 130b, and (following ellipsis) an Nth transceiver 130n. The ellipsis in FIG. 1 indicate that there may be any number of other transceivers coupled to the switch 110. The specific number of transceivers coupled to the switch 110 is left undefined for simplicity of illustration. In some embodiments the transceiver may be a ZR+ optical transceiver. In some embodiments the transceiver may be a CMIS-compliant transceiver. In some embodiments a variety of different types of transceivers may be coupled to the network switch device.

The user device 150 is communicatively connected to the network switch device 110 (switch 110) such that a user may configure the switch 110 as well as any transceivers 130 coupled to the switch 110. For example, the switch 110 may run an operating system or other software code that may receive commands from the user of the user device 150. The switch 110 may provide a hardware interface (e.g., RJ45) and a software interface (e.g., operating system or other software code) for communicating with the user device 150.

The transceivers 130 may be electronically coupled with the switch 110, by being plugged into ports of the switch 110 for example. When a transceiver 130 is coupled with the switch 110, an operating system or other software code executed by the switch 110 may be capable of reading application data from a memory (e.g., an EEPROM) of the transceiver 130. The application data may indicate one or more sets of parameters (referred to as applications or operating modes) that the transceiver is capable of operating in. The application data may contain values and identifiers of the parameters or a code indicating a particular set of parameters (e.g., based on a standard such as the CMIS standard or based on vendor/manufacturer specifications). The switch 110 may determine the parameters corresponding to the application data based on a stored mapping of application data (e.g., a particular code) to sets of parameters (e.g., operating speed, FEC, modulation, line-rate, optical reach, etc.).

As mentioned above, certain transceivers may be configurable in different operating modes. The switch 110 provides transceiver configuration software code 120 enabling configuration of the parameters of the transceivers 130. The transceiver configuration software 120 includes a transceiver mode reader 121 module, a configuration interface 122 module, and an operating mode setter 123 module.

The transceiver mode reader 121 module is configured to read data from memory of the transceivers 130 (e.g., from an EEPROM). The transceiver mode reader module 121 can read application data from a memory of a transceiver. The application data may indicate one or more operational modes supported by the transceiver. The transceiver configuration software 120 also includes a configuration interface 122 module. The reading of the application data and examples of the application data are described in further detail below.

The configuration interface 122 module is configured to receive inputs from the user device 150 and provide outputs to the user device 150. The configuration interface 122 provides an interface (e.g., a command line interface or graphical interface) indicating the one or more operational modes and identifiers of the one or more operational modes. For example, according to the CMIS standard each transceiver may advertise or store up to fifteen different applications, each having an associated application ID number. The configuration interface 122 may display the available applications for a transceiver (e.g., as a command line console output). The configuration interface 122 also provides prompts to the user device 150 and may receive input commands from the user device 150. The switch 110 may determine a set of applications that a particular transceiver 130 is capable of based on the application data read from the transceiver 130 and then the configuration interface 122 may provide (e.g., display, render, or present) a list of the available applications for that transceiver along with different application identifiers (e.g., numbers) corresponding to each of the different applications. The configuration interface 122 may be configured to receive an input selecting a particular application based on an identifier of a particular operating mode corresponding to that application. For instance, the user of the user device 150 may input a particular application ID for a particular transceiver via the configuration interface 122 (e.g., via a command line input) and the switch 110 may determine the operating parameters corresponding to the selected application. For instance, the switch 110 may store a table or other data structure mapping applications to sets of operating parameters. The configuration interface 122 may also be configured to display a status and any errors of the transceivers 130. The inputs and outputs of the configuration interface 122 are described in further detail below.

The transceiver configuration software 120 further includes a set operating mode 123 module that can configure a transceiver to operate in a selected operational mode based on a selection of an identifier corresponding to the selected operational modes. For instance, the user of user device 150 may have selected a particular application for a specific transceiver by inputting an identifier corresponding to that application for that transceiver using the configuration interface 122 and the switch 110 may determine the corresponding operating parameters for that application as discussed above. The set operating mode 123 module may then configure the transceiver to operate according to the selected application by setting each of the operating parameters corresponding to that application. The configuring of transceiver operating parameters is described in further detail below.

The transceiver configuration software 120 described above provides advantages over prior transceiver configuration techniques in situations where a transceiver requires more than one operating parameter to be set in order to select a particular application. As mentioned above, prior transceiver configuration techniques required a different command to set each operating parameter (e.g., operating speed, FEC, modulation, line-rate, optical reach, etc.). Requiring a user to input multiple commands to set an operating mode of the transceiver is inefficient and error prone. Instead of using separate commands, the improved transceiver configuration technique (e.g., transceiver configuration 120) described herein provides the user with application data indicating particular applications of the transceiver along with corresponding application identifiers and allows the user to set the operating mode of the transceiver using a single command that selects the application identifier.

Figure 2:
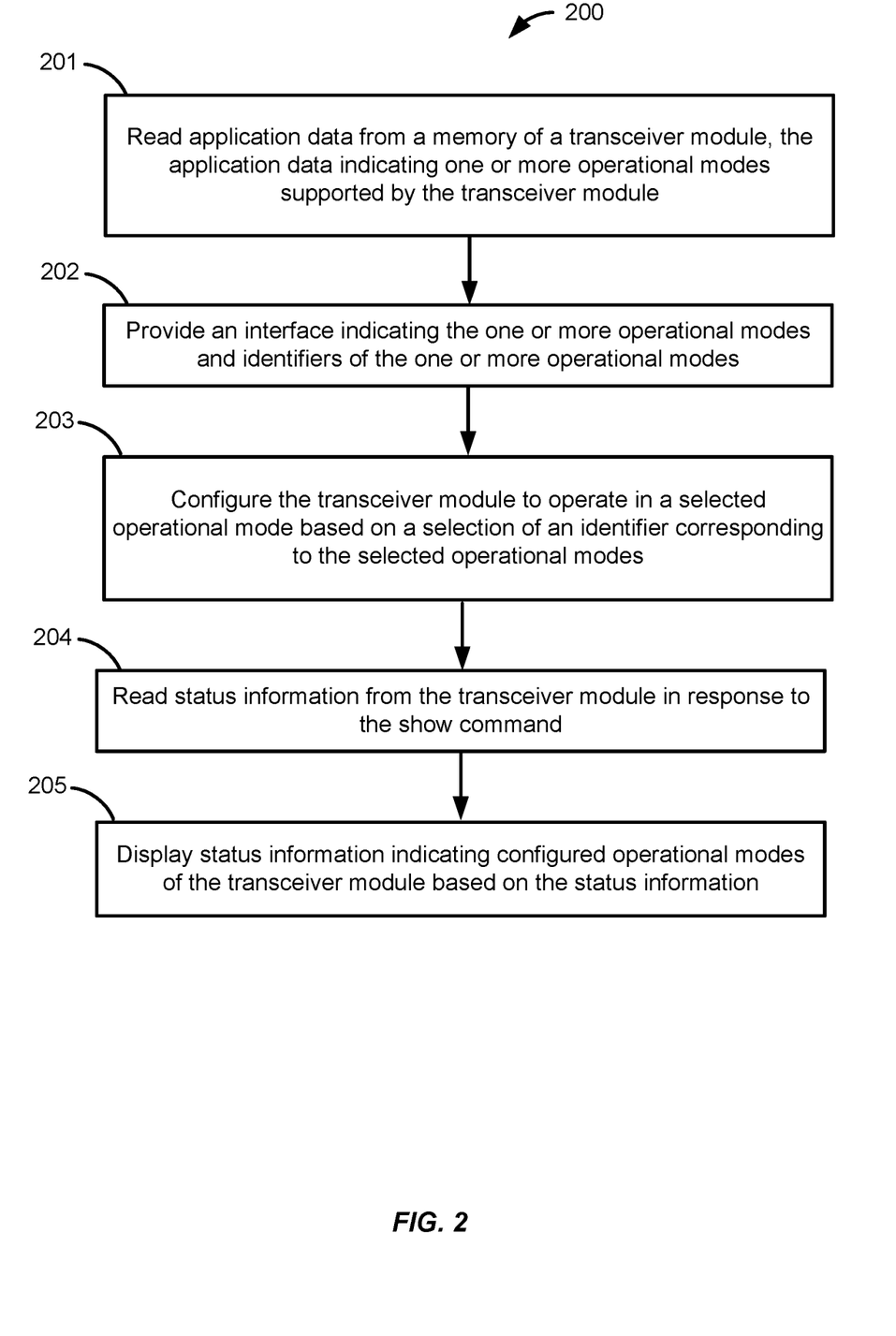
FIG. 2 shows a flow chart of a method for configuring a transceiver, according to an embodiment.

A process for configuring a transceiver using the improved configuration technique using an improved configuration interface will now be described. FIG. 2 shows a flow chart 200 of a method for configuring a transceiver, according to an embodiment. The method may be performed by a network switch device. The method may be performed by executing computer program code (e.g., software) including instructions to perform the various functions described below. For example, an operating system of a network switch device may be configured to perform this method.

At 201, read application data from a memory of a transceiver, the application data indicating one or more operational modes supported by the transceiver. As discussed above, the application data may be stored in an EEPROM of the transceiver and a network switch device may read this information from the EEPROM. The application data may indicate the available applications of the transceiver as discussed above. Examples and further details of the application data are provided below. In some embodiments the transceiver may be a ZR+ optical transceiver. In some embodiments the transceiver may be a CMIS-compliant transceiver. In some embodiments a variety of different types of transceivers may be coupled to the network switch device.

At 202, provide an interface indicating the one or more operational modes and identifiers of the one or more operational modes. As discussed above, a switch may provide a command line interface or other interface that presents the available operational modes (e.g., "applications") of the transceiver as well as identifiers of the one or more operational modes (e.g., "application identifiers"). The interface and the presentation of the operational modes are further described below.

At 203, configure the transceiver to operate in a selected operational mode based on a selection of an identifier corresponding to the selected operational modes. As discussed above, a user may input a particular identifier corresponding to an operational mode in a single command and the switch may configure the operating parameters of the transceiver according to that operating mode. The switch may access a table mapping the operating mode to a particular set of operating parameters. In some embodiments, the identifier corresponding to the selected operational mode may correspond to a particular code (e.g., a code read from the application data on the transceiver) and the code may map to a particular set of operating parameters.

At 204, read status information from the transceiver in response to the show command. The user may input a "show" command in order to be presented with status information regarding one or more of the transceivers. The status information may be read from a memory of the transceiver (e.g., from an EEPROM of the transceiver). In some embodiments, the show command may execute automatically after the transceiver has been configured.

At 205, display status information indicating configured operational modes of the transceiver based on the status information. The status information may be displayed via the interface (e.g., the command line interface). The status information may also indicate any errors with the transceiver or with the configuration of the transceiver (e.g., if configuring the operating mode failed).

Accordingly, the user managing the switch may be presented with an intuitive list of the applications available for a particular transceiver and may set the transceiver to a particular operating mode using a single command. In addition, the user may be presented with the status such that the operating mode can be confirmed. This improved technique avoids the error prone method of using separate configuration commands for each operating parameter and it further reduces or mediates errors by presenting the status and error information.

Figure 3:
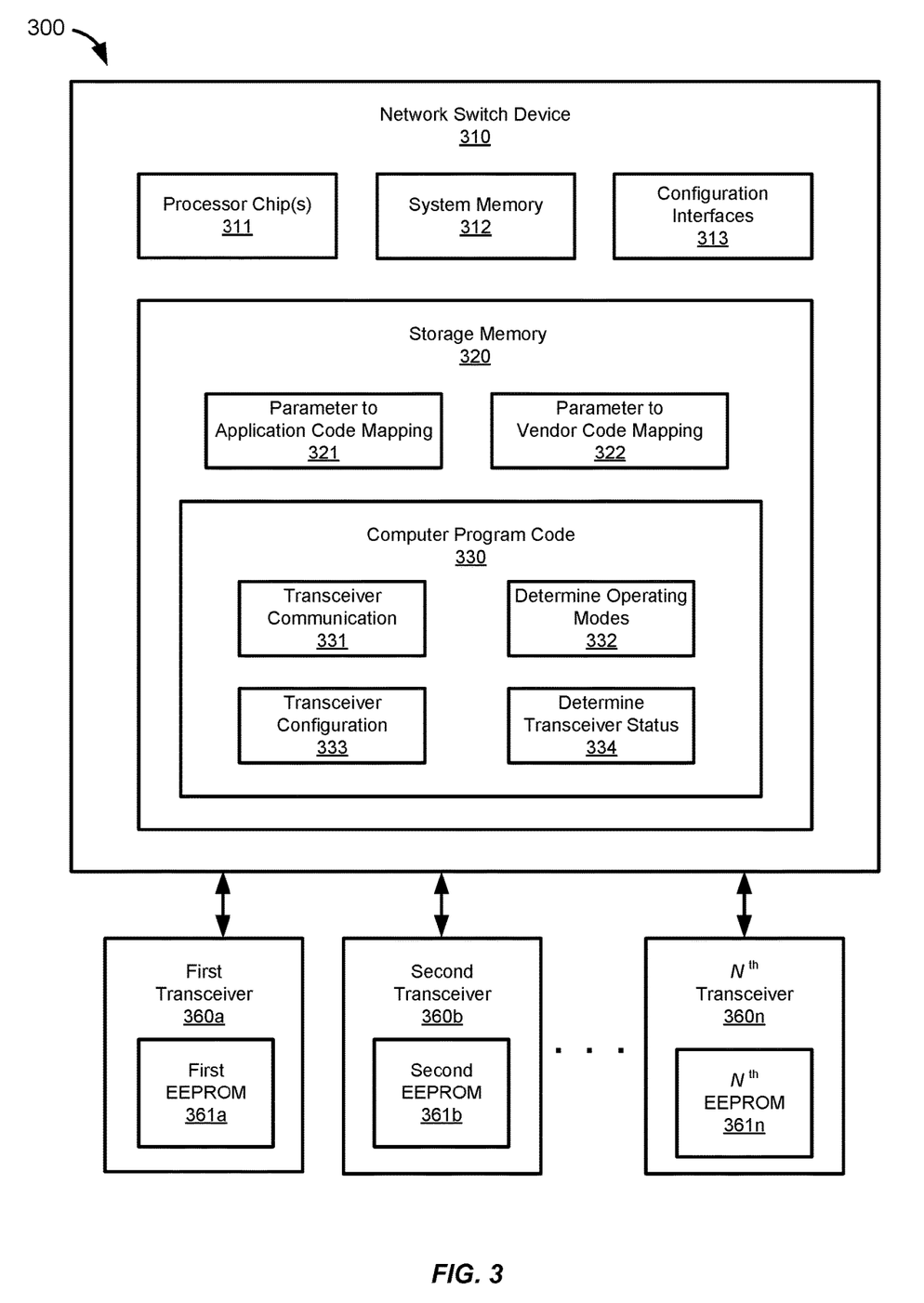
FIG. 3 shows a diagram of network switch device hardware, according to an embodiment.

The improved techniques for configuring transceivers will now be described in further detail with respect to computer hardware. FIG. 3 shows a diagram of network switch device 310 hardware, according to an embodiment. The network switch device 310 (switch 310) may be configured to perform the functionality described above with respect to FIG. 1 and FIG. 2. The switch 310 includes one or more processor chips 311 (e.g., a system on a chip or a central processing unit). The processor chips 311 may be electronically coupled to a system memory 312 (e.g., RAM). The processor chips 311 may also include their own internal memory. The processor chips 311 may also be electronically coupled to configuration interfaces 313 (e.g., a physical port or network interface that a user device may couple to in order to interface with software executed by the switch 310). The processor chips 311 may also be electronically coupled to a storage memory 320 (e.g., a hard disk or a solid state disk).

The storage memory 320 may store a parameter to application code mapping 321, which may be structured as a table. The application code mapping may be a mapping of application codes to operating parameters as defined by a particular standard (e.g., CMIS). The storage memory 320 may also store a parameter to vendor code mapping 322, which may be structured as a table. The vendor code mapping may be defined by vendor (or manufacturer) specific documentation. The storage memory 320 also includes computer program code 330.

The computer program code includes instructions to perform the functions of the network switch device described herein as well as other network switch functions. For example, the computer program code 330 includes transceiver communication 331 instructions to read data (e.g., application data) from the transceiver 360 (e.g., from its EEPROM 361) and to set an operating mode of the transceiver 360.

The computer program code 330 further includes instructions to determine operating modes 332. These instructions may take as input the application data obtained via the transceiver communication 331 instructions and then compare the application data (e.g., a code in the application data) to the parameter to application code mapping 321 and/or the parameter to vendor code mapping 332 in order to determine the operating mode (set of operating parameters) corresponding to that code.

The computer program code 330 further includes instructions for transceiver configuration 333 which may configure a transceiver 360 to operate in a particular mode according to a set of operating parameters. In some cases, a particular set of lanes of the transceiver may be set to one operating mode while other lanes may be set to a different operating mode. Configuration of the transceiver and examples are given below. The transceiver configuration 333 instructions may be configured to receive an input from a user, via configuration interfaces 313, indicating a particular application identifier. A code corresponding to that identifier may be determined (e.g., based on codes read from the transceiver EEPROM and the position of the code in the EEPROM memory) and the code may be used to determine the operating mode as discussed above.

The computer program code 330 further includes instructions to determine the transceiver status 334 and output the status for presentation to a user via the configuration interfaces 313. The status may indicate the current operating mode of the transceiver and any error codes. The status may be determined by communicating with the transceiver using transceiver communication instructions 331.

The network switch device 310 may be electronically coupled to one or more transceivers 360. The processor chips 311 may be configured to read data from an EEPROM 361 of a transceiver and set an operating mode of the transceiver 360 as described herein. FIG. 3 shows a first transceiver 360a including a first EEPROM 361a, a second transceiver 360b including a second EEPROM 361b, an ellipsis ( . . . ) indicating an indeterminate number of intermediate transceivers, and an Nth transceiver 360n including an Nth EEPROM 361n. Three transceivers are shown for simplicity of illustration but more transceivers or fewer transceivers may be coupled with the switch 310.

Accordingly, the switch 310 may execute computer program code instructions to read application data from the EEPROMs 361 of the transceivers 360. The application codes may be stored in particular bytes of the EEPROM, which are assigned to particular application identifiers. The application codes may be mapped to parameters in the application code mapping 321 or the vendor code mapping 322. The network switch 310 may then present a user, via configuration interfaces 313, with a set of applications that the transceiver is capable of along with corresponding application identifiers. The presentation of the set of applications to the user may include indicators of the application code or any of the operating parameters associated with that application code in the mappings. The user may then select a particular application identifier (corresponding to an application code which is mapped to a set of operating parameters), via the configuration interfaces 313, and the switch 310 may configure the operating mode of the transceiver 360 using the operating parameters defined in the application code mapping 321 or the vendor code mapping 322. Thus, the user may configure the transceiver in an efficient and error-resistant manner using a single command indicating the application identifier instead of inputting multiple different commands to set different operating parameters as in prior transceiver configuration techniques.

EXAMPLES

Examples providing further details of transceiver configuration are provided below.

The operating speed of transceivers may be configured through a "speed" command, for example. Different speeds such as 40G and 100G may be configured in the transceiver EEPROM by turning off/on the CDR (clock data recovery) functionality.

As another example, the Common Management Interface Specification (CMIS) allows for the advertisement of up to fifteen 'applications' or operating modes allowing for variations in functionality across different dimensions such as operating speed, error-correction, modulation, line-speed and any other settings in the transceiver. The 'speed' command may be used for selecting between applications of OSFP and QSFP-DD form factor modules, for example.

As discussed above, transceivers may support multiple speeds. A network operating system of a network switch device may provide a command interface to provide input to the transceiver to configure the speed of the transceiver, selecting from among the supported speeds. Network operating systems may also provide a command interface to define a combination of inputs to configure the transceiver, such as commands to set a combination of speed, FEC, line speed etc. As mentioned above, the network switch device may store a mapping of application data (e.g., a particular code) to sets of parameters (e.g., operating speed, FEC, modulation, line-rate, optical reach, etc.). The network switch device may further store a lookup table that maps the various inputs for configuring the transceiver to a particular application code. A lookup table may also encode vendor specific mappings from vendor-specified application codes to applications (e.g., OpenZR+ applications) and use the same matrix of inputs—speed, FEC, line speed, modulation to arrive at the application code to configure in the module. Accordingly, an application code may be mapped to sets of parameters and to a set of inputs used to configure the transceiver according to use those parameters.

Some transceivers have additional parameters that can be configured other than speed. For instance, certain transceivers may have two or more different forward error-correction (FEC) encodings available. The default may be Concatenated FEC (C-FEC) or Open FEC (O-FEC). The choice of FEC effectively translates into different modes of operation with different applications. A network switch device may be able to configure this parameter through an "error-correction encoding" interface-level configuration command.

OpenZR+ is a multi-source agreement (MSA) that proposes a standard for a 400GBASE-ZR+ coherent optical transceiver, for example. In addition to the applications of 400GBASE-ZR, the ZR+ adds multiple new modes of operation by introducing more parameters: line-rate, modulation, optical reach. Prior network switch devices may use an approach of utilizing individual CLI configuration commands for each parameter. This technique may still be applied, however, it may not offer a straightforward experience for the user who would be required to apply several (e.g., 5 or 6) commands in order to correctly configure the desired application on the ZR+ transceiver. Furthermore, the individual command approach is likely error-prone as it makes it difficult to understand what applications are available on the transceiver and which parameter combinations are valid.

Transceivers may support other applications as well. For instance, a transceiver having a media interface of ZR400-OFEC-16QAM can have 3 different operational modes—1×400G, 2×200G,4×100G. A user could select ZR400-OFEC-16QAM (2×200GBASE-R) by using a combination of 3 inputs—the speed of the Ethernet interfaces (200G), the FEC configuration (O-FEC), the modulation (16QAM). As the application codes to be programmed in the transceiver EEPROM may be vendor proprietary, there could be a lookup table in the network switch device to map this combination to say '0xC6' for vendor A, or '0xD7' for vendor B, based on their datasheet, for example. Furthermore, 0xC6 might appear at position '7' in vendor A's transceiver EEPROM and 0xD7 at position '9' in vendor B's transceiver EEPROM. The code to be programmed in the EEPROM would then be 7 for vendor A's module and 9 for vendor B's module.

To expand further, 400GBASE-ZR+ transceivers provide implementation of Internet Protocol over dense wavelength division multiplexing (IPoDWDM) coherent transceiver/transponder applications, defined by the OpenZR+ specification and support reaches up to 1000 km. 400GBASE ZR+ transceivers have multiple operational modes as defined in OpenZR+ specification. The CMIS specification which governs OSFP/QSFP-DD transceivers allows the transceiver to advertise up to fifteen such applications in its EEPROM using application codes. These application codes are usually well defined and industry standardized in SFF-8024. Traditionally, transceivers can support multiple speeds and FEC configurations and the correct application to be configured can be deduced using a combination of CLI commands such as speed, FEC, line speed, modulation, etc. ZR+ transceivers support operational modes specified in the OpenZR+ specification but at present, there is no industry standard mechanism of mapping the advertised application numbers to the well defined operational modes. Therefore, different vendors use vendor proprietary codes that map to the operational modes specified in the OpenZR+ specification. There is no standardized method to select a matching OpenZR+ application from different vendor transceivers.

As discussed above, requiring a user to input a different command to set each parameter, as in prior network switch software for configuration of transceivers, is inefficient and error prone. Furthermore, it may be difficult for a user to recognize which applications are available for the transceiver and which parameter combinations are a valid operating mode. As discussed above, the present disclosure provides improved techniques for configuring transceivers by providing a single command that can be used to configure a transceiver for a particular operating mode based on an application identifier/number. The command receives an application number as input and the transceiver is configured according to the operating parameters corresponding to that application number.

To expand further, the improved configuration technique lets the user directly look at the datasheet for the vendor's module to determine that the application they wish to program is code '0xC6'. This may avoid ambiguity and allow for flexibility. The improved configuration technique interface has a command to show users that 0xC6 appears at position '7' and allows the user to choose '7' in the CLI configuration command directly without having to jump through multiple different CLI commands to arrive at their desired configuration. Furthermore, if a vendor decides to add new functionality beyond the scope of an industry standard, the user can simply choose such a code and program it into the transceiver by this mechanism.

The improved transceiver configuration described here provides a combination of multiple CLI commands. The first CLI command shows the descriptions for all the application codes and other information advertised in the EEPROM module (show interface transceiver eeprom). A second CLI command (transceiver application override <app code>[start <start lane>] [end <end lane>]) allows for the configuration of any of the advertised modes into the transceiver. The brackets indicate optional parameters. This provides users a flexible mechanism to apply any advertised application to the desired lane(s) of the inserted transceiver. A third CLI command shows the currently operational application on all lanes of the inserted transceiver. To expand further, the improved techniques provide the following functionality:

1) Display the available applications that the module may accept. The improved configuration interface and technique uses a combination of industry-standard codes, such as available in SFF-8024, OpenZR+ and possibly any future specifications, in addition to per-vendor transceiver datasheets to decipher applications that may be vendor-specific, proprietary and not-yet industry standard.

2) Allow the user to directly pick the appropriate application number and configure it on the applicable lanes in the modules. In certain instances, a single module may accept a combination of multiple applications—for example Application '2' on lanes 1-4 and Application '5' on lanes 5-8. This allows for flexible configuration on a per lane basis.

3) To facilitate debugging, the improved configuration interface displays the operational status and any configuration error codes to indicate to the user whether the configured applications were accepted by the transceiver firmware or not and the respective error codes.

Thus, the improved technique provides a flexible mechanism for configuring operational modes on transceivers (e.g., CMIS transceivers), such as 400GBASE-ZR+ transceivers.

The improved transceiver configuration described herein simplifies configuration by empowering users to choose an application based on their requirements and allows more flexibility in using transceivers from multiple vendors on the same switch. Even if the vendor adds capabilities to their transceiver that may be outside the scope of the OpenZR+ spec or any other future specification, the improved transceiver configuration technique described herein may automatically allow the users to use such capabilities without modifications to the network switch device.

Further details of the improved transceiver configuration are provided below.

The command line interface commands of the improved transceiver configuration will now be described. This improved transceiver configuration allows users to configure an application on CMIS modules while ignoring any other configuration CLI commands that might have been issued. This may be done by directly specifying the ID of the desired application.

For example, in order to override a previously selected application the following command may be issued to a transceiver:
transceiver application override <1-15>[lanes start <X> [end <Y>]]
for example, the command:
transceiver application override 6
will copy over the application until all lanes of the transceiver are filled with application 6.

If the start lane is not specified, the application will be copied starting at the first lane. If the end lane is not specified, the application will be copied to each lane starting with the starting lane through the last lane. If the start lane and the end lane are not specified then the application will be copied to all lanes, Here are some example commands:
transceiver application override 6 lanes start 1
transceiver application override 6 lanes start 3
transceiver application override 6 lanes start 5
transceiver application override 6 lanes start 7

Example where App 2 is 4 lanes wide and app 4 is also 4 lanes wide:
transceiver application override 2 lanes start 1
transceiver application override 4 lanes start 5

If the optional 'start' parameter is provided then configure the application for that given data path lane, otherwise assume all lanes were selected.

If the optional 'lanes' keyword is provided, then specify over how many lanes the application will be applied. This is meant to be a workaround in case the advertised application doesn't correctly report the number of lanes used.

This is an example command to remove the override and allow configuration commands to select applications:
(config-if-EtX/1)#no|default transceiver application override [ID]

The network switch device side may be configured via the speed command, as shown below, in order to match the application of the overridden application. A link between the network switch device and a transceiver may not come up until the network switch device matches the transceiver's expectations.
(config-if-EtX/1-8)#speed X The improved configuration interface provides a "show" command as a way to display the currently configured applications. Some CMIS modules can have a mix of applications running on different data path lanes at the same time. The same "show" command can be used to display Configuration Error Codes (page 11h:202-205).

The "show" command may be used as follows:
Show transceiver application interface ethernet 4/1

An example of the output corresponding to the above command is as follows. In this examples, the "host" refers to the side of the transceiver coupled with the network switch device:

Active applications:
Application 1: host: 400GAUI-8 C2M, media: 400GBASE-ZR
Starting on host lane 1, using host lanes 1,2,3,4,5,6,7,8
Other examples of output for various scenarios:
Active CMIS applications:
Application 4: host: 200GAUI-4 C2M, media: 200GBASE-SR4
Starting on host lane 1, using host lanes 1,2,3,4
Starting on host lane 5, using host lanes 5,6,7,8
Active CMIS applications:
Application 4: host: 200GAUI-4 C2M, media: 200GBASE-SR4
Starting on host lane 1, using host lanes 1,2,3,4
Application 2: host: 100GAUI-2 C2M 100GBASE-SR2
Starting on host lane 5, using host lanes 5,6
Starting on host lane 7, using host lanes 7,8
Active CMIS applications:
Application 4: host: 200GAUI-4 C2M, media: 200GBASE-SR4
Starting on host lane 1, using host lanes 1,2,3,4
Application 2: host: 100GAUI-4 C2M, media: 100GBASE-SR4
Starting on host lane 5, using host lanes 5,6,7,8

The "show" command may also report the Configuration Error Code (Status) using the command above. The messages may be decoded according to the configuration error code table 900 shown in FIG. 9.

Active CMIS applications:
Application 1: 400GAUI-8 C2M, media: 400GBASE-ZR
Starting on host lane 1, using host lanes 1,2,3,4,5,6,7,8
Configuration Status:
Config accepted on host lanes 1,2,3,4,5,6,7,8
Other examples:
Configuration Status:
Config accepted on host lanes 1,2,3,4
Config rejected on host lanes 5,6 (reason: invalid code)
Config rejected on host lanes 7,8 (reason: invalid combo)
Config pending on host lanes 1,2
Config rejected on host lanes 3,4 (reason: 0xD)
Configuration Status:
Config rejected on host lanes . . . (reason: unknown|invalid code|invalid combo|invalid SI|in use|incomplete lane info|other)

The available applications can be seen in the output of 'show interfaces transceiver eeprom' command:
show interfaces ethernet 13/1 transceiver eeprom
Ethernet13 EEPROM:
  Identifier (00h:0,128):
Lower (00h:0): QSFP-DD Double Density 8X Pluggable Transceiver (INF-8628)
Upper (00h:128): QSFP-DD Double Density 8X Pluggable Transceiver (INF-8628)
  Revision compliance (00h:1): version 4.1
  Status fields (00h:2):
Flat mem (00h:2): false
TWI max speed (00h:2): 1 MHz
  Application select (00h:85-117;01h:176-190,223-250):
Module type encoding (00h:85): Optical Interfaces: SMF
Application 1 (00h:86-89;01h:176):
  Host electrical interface (00h:86): 400GAUI-8 C2M
  Module media interface (00h:87): 400GBASE-ZR
  Host lane count (00h:88): 8
  Media lane count (00h:88): 1
  Host lane assignment options (00h:89): 1
  Media lane assignment options (01h:176): 1

Application 2 (00h:90-93;01h:177):
  Host electrical interface (00h:90): 400GAUI-8 C2M
  Module media interface (00h:91): 0x3F
  Host lane count (00h:92): 8
  Media lane count (00h:92): 1
  Host lane assignment options (00h:93): 1
  Media lane assignment options (01h:177): 1
Application 3 (00h:94-97;01h:178):
  Host electrical interface (00h:94): 100GAUI-2 C2M
  Module media interface (00h:95): 400GBASE-ZR
  Host lane count (00h:96): 2
  Media lane count (00h:96): 1
  Host lane assignment options (00h:97): 1, 3, 5, 7
  Media lane assignment options (01h:178): 1
Application 4 (00h:98-101;01h:179):
  Host electrical interface (00h:98): 400GAUI-8 C2M
  Module media interface (00h:99): 400GBASE-ZR O-FEC
  Host lane count (00h:100): 8
  Media lane count (00h:100): 1
  Host lane assignment options (00h:101): 1
  Media lane assignment options (01h:179): 1

Example Network Device Hardware

Figure 4:
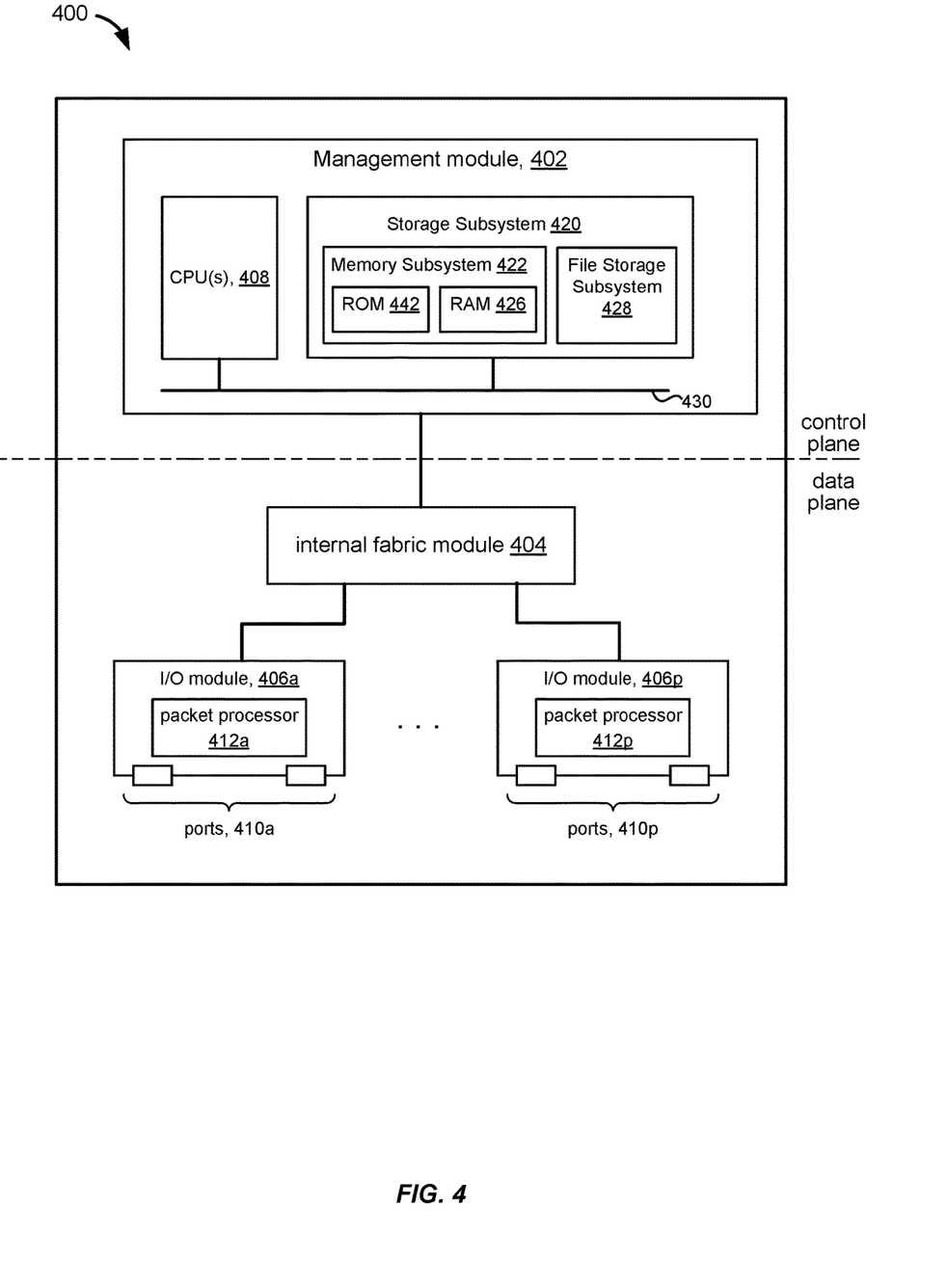
FIG. 4 shows an illustration of a network switch device that can be adapted according to one or more embodiments of the present disclosure.

FIG. 4 illustrates a network switch device 400 that can be adapted according to one or more embodiments of the present disclosure. The network switch device 400 may be a switch or a router, for example. As shown, network switch device 400 can include a management module 402, an internal fabric module 404, and a number of I/O modules 406a-406p. The management module 402 may be disposed in a control plane (also referred to as control layer) of the network switch device 400 and can include one or more management CPUs 408 for managing and controlling operation of network switch device 400 in accordance with the present disclosure. Each management CPU 408 can be a general purpose processor, such as an Intel®/AMD® x86-64 or ARM® processor, that operates under the control of software stored in memory, such as a storage subsystem 420, which may include read-only memory (ROM)442 and/or random access memory (RAM)426. In some embodiments, the CPU 408 may include control circuitry, and may include or be coupled to a non-transitory storage medium storing encoded instructions that cause the CPU 408 to perform operations described herein. In some embodiments, the non-transitory storage medium may include encoded logic or hardwired logic for controlling operation of the CPU 408. The control plane refers to all the functions and processes that determine which path to use, such as routing protocols, spanning tree, and the like.

Internal fabric module 404 and I/O modules 406a-406p collectively represent the data plane of network switch device 400 (also referred to as data layer, forwarding plane, etc.). Internal fabric module 404 is configured to interconnect the various other modules of network switch device 400. Each I/O module 406a-406p includes one or more input/output ports 410a-410p that are used by network switch device 400 to send and receive network packets. Each I/O module 406a-406p can also include a packet processor 412a-412p. Each packet processor 412a-412p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

In the above description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order. The terms "component," "process," "unit," and "module" may refer to a hardware circuit or to a set of program code or instructions.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
  reading, by a computer device, application data from a memory of a transceiver, the application data indicating one or more operational modes supported by the transceiver;
  receiving, by the computer device via an interface, a single command selecting an identifier corresponding to a selected operational mode from among one or more operational modes, each of the one or more operational modes comprising a plurality of configurable parameters, the interface providing the one or more operational modes and identifiers of the one or more operational modes; and
  configuring, by the computer device, the transceiver to operate in the selected operational mode using configurable parameters of the selected operational mode based on the single command selecting the identifier corresponding to the selected operational mode.

2. The computer-implemented method of claim 1, wherein the transceiver includes a media interface including a plurality of lanes and wherein configuring the transceiver comprises configuring, using the identifiers of the operational modes, different operational modes on different ones of the plurality of lanes.

3. The computer-implemented method of claim 1, further comprising:
applying, by the computer device, a show command to the transceiver;
reading, by the computer device, status information from the transceiver in response to the show command; and
displaying, by the computer device, status information indicating configured operational modes of the transceiver based on the status information.

4. The computer-implemented method of claim 3, wherein the status information includes configuration error codes providing status information indicating whether each configured operational mode of the transceiver is configured properly or not configured properly.

5. The computer-implemented method of claim 1, wherein the application data indicating one or more operational modes supported by the transceiver includes one or more application codes indicating the corresponding one or more operational modes, the computer device storing a mapping of application codes to operational modes, the mapping indicating operating parameters for the one or more operational modes.

6. The computer-implemented method of claim 1, wherein each identifier of the identifiers of the one or more operational modes has a value corresponding to a memory location of an application code indicating the operational mode of the transceiver in an EEPROM of the transceiver.

7. The computer-implemented method of claim 1, wherein the transceiver comprises a ZR+ optical transceiver or a Common Management Interface Specification (CMIS) compliant transceiver.

8. A computer system, comprising:
one or more processors; and
one or more machine-readable medium coupled to the one or more processors and storing computer program code comprising sets of instructions executable by the one or more processors to:
read application data from a memory of a transceiver, the application data indicating a plurality of operational modes supported by the transceiver, each operational mode comprising a plurality of configurable parameters;
provide an interface indicating the one or more operational modes and identifiers of the one or more operational modes; and
configure the transceiver to operate in a selected operational mode based on a single command selecting an identifier corresponding to the selected operational mode.

9. The computer system of claim 8, wherein the transceiver includes a media interface including a plurality of lanes and wherein configuring the transceiver comprises configuring, using the identifiers of the operational modes, different operational modes on different ones of the plurality of lanes.

10. The computer system of claim 8, wherein the computer program code further comprises sets of instructions executable by the one or more processors to:
apply a show command to the transceiver;
read status information from the transceiver in response to the show command; and
display status information indicating configured operational modes of the transceiver based on the status information.

11. The computer system of claim 10, wherein the status information includes configuration error codes providing status information indicating whether each configured operational mode of the transceiver is configured properly or not configured properly.

12. The computer system of claim 8, wherein the application data indicating one or more operational modes supported by the transceiver includes one or more application codes indicating the corresponding one or more operational modes, the computer system storing a mapping of application codes to operational modes, the mapping indicating operating parameters for the one or more operational modes.

13. The computer system of claim 8, wherein each identifier of the identifiers of the one or more operational modes has a value corresponding to a memory location of an application code indicating the operational mode of the transceiver in an EEPROM of the transceiver.

14. The computer system of claim 8, wherein the transceiver comprises a ZR+ optical transceiver or a Common Management Interface Specification (CMIS) compliant transceiver.

15. A non-transitory computer-readable medium comprising computer program code including sets of instructions to:
read application data from a memory of a transceiver, the application data indicating a plurality of operational modes supported by the transceiver, each operational mode comprising a plurality of configurable parameters, the plurality of configurable parameters including a speed parameter;
provide an interface indicating the plurality of operational modes, values for the plurality of configurable parameters corresponding to each of the plurality of operational modes, and identifiers of the plurality of operational modes, the plurality of operational modes including a first operational mode identified by a first identifier, a second operational mode identified by a second identifier, and a third operational mode identified by a third identifier, the first operational mode having a first speed parameter that is the same as a second speed parameter of the second operational mode and that is different from a third speed parameter of the third operational mode, the first operational mode having a first non-speed parameter that is different from a second non-speed parameter of the second operational mode and that is the same as a third non-speed parameter of the third operational mode; and
configure the transceiver to operate in the first operational mode using the first speed parameter and the first non-speed parameter based on a single command selecting the first identifier corresponding to the first operational mode.

16. The non-transitory computer-readable medium of claim 15, wherein the transceiver includes a media interface including a plurality of lanes and wherein configuring the transceiver comprises configuring, using the identifiers of the operational modes, different operational modes on different ones of the plurality of lanes.

17. The non-transitory computer-readable medium of claim 15, wherein the computer program code further includes sets of instructions to:
apply a show command to the transceiver;
read status information from the transceiver in response to the show command; and display status information indicating configured operational modes of the transceiver based on the status information.

18. The non-transitory computer-readable medium of claim 15, wherein the status information includes configuration error codes providing status information indicating whether each configured operational mode of the transceiver is configured properly or not configured properly.

19. The non-transitory computer-readable medium of claim 15, wherein the application data indicating one or more operational modes supported by the transceiver includes one or more application codes indicating the corresponding one or more operational modes, wherein a mapping of application codes to operational modes indicates operating parameters for the one or more operational modes.

20. The non-transitory computer-readable medium of claim 15, wherein the transceiver comprises a ZR+ optical transceiver or a Common Management Interface Specification (CMIS) compliant transceiver.

* * * * *